US009394992B2

(12) United States Patent
Fujimura et al.

(10) Patent No.: US 9,394,992 B2
(45) Date of Patent: Jul. 19, 2016

(54) SHEAVE POSITIONING DEVICE

(75) Inventors: Shinya Fujimura, Susono (JP);
Takahiro Yokokawa, Susono (JP);
Takaho Kawakami, Susono (JP); Yuji Hattori, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 484 days.

(21) Appl. No.: 13/002,060

(22) PCT Filed: Dec. 2, 2008

(86) PCT No.: PCT/JP2008/071842
§ 371 (c)(1),
(2), (4) Date: Dec. 30, 2010

(87) PCT Pub. No.: WO2010/064296
PCT Pub. Date: Jun. 10, 2010

(65) Prior Publication Data
US 2011/0118066 A1    May 19, 2011

(51) Int. Cl.
*F16H 61/12*    (2010.01)
*F16H 61/662*    (2006.01)
*F16H 61/66*    (2006.01)

(52) U.S. Cl.
CPC .......... *F16H 61/66259* (2013.01); *F16H 61/12* (2013.01); *F16H 61/66272* (2013.01); *F16H 2061/1264* (2013.01); *F16H 2061/6605* (2013.01)

(58) Field of Classification Search
USPC ............ 474/8, 11, 18, 28, 29; 477/38, 44, 45, 477/46, 50, 143; 251/63.5; 475/210, 211
See application file for complete search history.

(56) References Cited

U.S. PATENT DOCUMENTS

| 2,788,192 | A | * | 4/1957 | Mountford | 251/63.5 |
| 2,811,958 | A | * | 11/1957 | Roush, Jr. | 123/46 R |
| 4,459,879 | A | * | 7/1984 | Miki et al. | 477/49 |
| 5,156,572 | A | * | 10/1992 | Morishige | 474/70 |
| 2002/0170383 | A1 | * | 11/2002 | Fujikawa et al. | 74/606 R |
| 2003/0027673 | A1 | * | 2/2003 | Suzuki et al. | 474/28 |

FOREIGN PATENT DOCUMENTS

| JP | 04078371 A | * | 3/1992 | F16H 61/12 |
| JP | 04 157256 | | 5/1992 | |

(Continued)

OTHER PUBLICATIONS

International Search Report issued Mar. 10, 2009 in PCT/JP2008/071842 filed Dec. 2, 2008.

*Primary Examiner* — Sang Kim
*Assistant Examiner* — Juan Campos, Jr.
(74) *Attorney, Agent, or Firm* — Oblon, McClelland, Maier & Neustadt, L.L.P

(57) ABSTRACT

A sheave positioning device is provided. A valve element is arranged on a flow path to close the flow path when pushed in a direction against a pressure from hydraulic chambers, and a valve closing mechanism is also arranged on the flow path to generate a thrust force for pushing the valve element in the direction against a pressure from the hydraulic chambers. The valve closing mechanism is adapted to generate the thrust force, which is larger than a load to be applied to the valve element to push the valve element in a direction to open the valve element in case a predetermined speed change ratio is being set, but smaller than a load to be applied to the valve element to push the valve element in a direction to open the valve element in case the pressure in the hydraulic chambers is raised to the maximum pressure.

5 Claims, 2 Drawing Sheets

(56) References Cited

FOREIGN PATENT DOCUMENTS

| JP | 05 33839 | 2/1993 | |
| JP | 2004124960 A | * 4/2004 | ............... F16H 61/12 |
| JP | 2004 204944 | 7/2004 | |
| JP | 2005 273730 | 10/2005 | |
| JP | 2006 300270 | 11/2006 | |
| JP | 2007 57033 | 3/2007 | |
| JP | 2007 303485 | 11/2007 | |

* cited by examiner

SHEAVE POSITIONING DEVICE

TECHNICAL FIELD

This invention relates to a device for positioning a movable sheave of a transmission mechanism comprising a pulley to which a power transmission member such as a belt is applied and which includes a fixed sheave and the movable sheave. More specifically, the present invention relates to a device for keeping a position of the movable sheave by holding a pressure fluid in an actuator.

BACKGROUND ART

A belt-type continuously variable transmission is known in the art as a transmission mechanism of a vehicle. The belt-type continuously variable transmission comprises: a primary pulley of a driving side or an input side; a secondary pulley of a driven side or an output side; and a belt applied to those pulleys. In the belt-type continuously variable transmission, a sped change ratio is set acceding to a running radius of the belt thus applied to those pulleys. Each pulley comprises a fixed sheave and a movable sheave, and a groove between those sheaves to which the belt is applied is changed to vary the running radius of the belt. Specifically, the fixed sheave is integrated with a rotational shaft, and the movable sheave is adapted to reciprocate axially on the rotational shaft thereby varying a clearance between those sheaves. In addition, opposed faces of those sheaves are individually tapered to form a groove between those sheaves and the belt is applied the groove thus formed.

A transmission torque capacity of the belt-type continuously variable transmission is varied in accordance with a contact pressure between the belt and the pulleys, that is, in order to transmit the torque, the belt has to be clamped by pushing the movable sheave toward the fixed sheave. For this purpose, it is necessary to carry out a control for positioning the movable sheave to set a speed change ratio, and a control for clamping the belt by pushing the movable sheave toward the fixed sheave simultaneously in the belt-type continuously variable transmission. Therefore, in the prior art, the speed change ratio is controlled by controlling a position of the movable sheave of any one of the pulleys (e.g., the primary pulley of the driving side), and the speed change ratio is controlled by controlling a pressure pushing the movable sheave of the other pulley (e.g., the secondary pulley of the driven side).

Specifically, the speed change ratio is controlled by carrying out a feedback control of a flow rate of pressure fluid such as operating oil to be fed to an actuator of the primary pulley. However, even in case of keeping the speed change ratio constant, the pressure for clamping the belt is still required. Therefore, in order not to vary the position of the movable sheave, the pressure fluid is being fed to the movable sheave in a slight amount. Indeed, as a result of thus feeding the pressure fluid continuously without carrying out a speed change, a leakage of the pressure fluid is also continued and this causes an energy loss. For example, in order to avoid such a disadvantage, Japanese Patent Laid-Opens Nos. 2006-300270 and 2007-57033 disclose an improved belt-type continuously variable transmission. According to the teachings of Japanese Patent Laid-Opens Nos. 2006-300270 and 2007-57033, a control valve (or one-way valve) adapted to open only to a feeding side of operating oil is arranged on an oil passage for feeding the operating oil to push the movable sheave toward the fixed sheave, and a control valve (or one-way valve) adapted to open only to a discharging side of operating oil is arranged on an oil passage for discharging the operating oil to move the movable sheave away from the fixed sheave. The belt-type continuously variable transmission taught by Japanese Patent Laid-Opens Nos. 2006-300270 and 2007-57033 further provided with a hydraulic system that selectively prevent the control valve from opening.

In addition, Japanese Patent Laid-Open No. 5-33839 discloses a mechanism for controlling a centrifugal pressure, and Japanese Patent Laid-Open No. 2005-273730 teaches to divide a hydraulic chamber for setting a clamping force into two chambers having different pressure receiving areas, and to determine a ratio between those pressure receiving areas.

In a vehicle, a speed change ratio of high speed side is set comparatively frequently. In case of keeping the speed change ratio of high speed side, it is possible to reduce energy loss by preventing or reducing a leakage of the operating oil by preventing discharging of the operating oil using the hydraulic system taught by Japanese Patent Laid-Opens Nos. 2006-300270 and 2007-57033. However, a control for selectively stopping the operating oil being discharged to carry out a downshifting is basically executed electrically. For this purpose, the aforementioned hydraulic system is provided with a solenoid valve controlled electrically to selectively prevent the control valve of the discharging side from opening. However, if an electrical failure occurs, the control valve of the discharging side is kept to be closed, and as a result, the speed change ratio may be fixed to the high speed side. The belt-type continuously variable transmission is configured to maintain a torque transmission capacity by clamping a belt by a pulley, therefore, the speed change ratio cannot be varied if the transmission is not rotated. For this reason, if the vehicle is stopped under the situation where the speed change ratio is fixed to the high speed side, a driving torque may be insufficient to restart the vehicle. As a result, in the worst case, the vehicle cannot be restarted, or otherwise, the engine stall may occur.

DISCLOSURE OF THE INVENTION

The present invention has been conceived noting the technical problems thus far explained. Therefore, an object of the present invention is to provide a sheave positioning device for a continuously variable transmission, which is capable of carrying out a control for fixing a speed change ratio without causing a power loss, and which is capable of unlocking a fixed speed change ratio certainly.

In order to achieve the above-mentioned object, according to the present invention, there is provided a sheave positioning device, comprising a pulley to which a belt is applied including a fixed sheave and a movable sheave being opposed to the fixed sheave, a flow path which allows to discharge a pressure fluid from a hydraulic chamber pushing the movable sheave toward the fixed sheave, a valve element arranged on the flow path to close the flow path when pushed in a direction against a pressure from the hydraulic chamber, and a valve closing mechanism arranged on the flow path to generate a thrust force for pushing the valve element in the direction against the pressure from the hydraulic chamber, characterized in that: the valve closing mechanism is adapted to generate the thrust force, which is larger than a load to be applied to the valve element to push the valve element in a direction to open the valve element in case a predetermined speed change ratio is being set, but smaller than a load to be applied to the valve element to push the valve element in a direction to open the valve element in case the pressure in the hydraulic chamber is raised to the maximum pressure.

Specifically, the valve closing mechanism comprises a piston member adapted to generate a thrust force as a product of: a predetermined hydraulic pressure; and an area of its pressure receiving face of a valve closing side to which the hydraulic pressure is applied. The aforementioned valve element comprises a pressure receiving face of a valve opening side having a predetermined area to generate a force for pushing the valve element in the direction to open the valve element when the pressure of the hydraulic chamber is applied thereto. Meanwhile, the area of the pressure receiving face of the valve closing side is set to generate the thrust force when the hydraulic pressure is applied thereto, which is smaller than the load to be applied to the pressure receiving face of the valve opening side in the direction to open the valve element in case the pressure in the hydraulic chamber is raised to the maximum pressure.

The pressure in the hydraulic chamber is raised to a maximum pressure by closing the flow path by the valve element, while increasing a tension of the belt to a structurally determined maximum tension thereof.

In addition, the sheave positioning device of the present invention comprises a secondary pulley to which the belt is applied. The secondary pulley comprises: a second fixed sheave; a second movable sheave being opposed to the second fixed sheave and adapted to move closer to the second fixed sheave and away from the second fixed sheave; and a second hydraulic chamber adapted to push the second movable sheave toward the second fixed sheave. Here, the pressure in the hydraulic chamber is raised to the maximum pressure by closing the flow path by the valve element, while raising a pressure in the second hydraulic chamber to a structurally governed maximum pressure thereof.

The sheave positioning device of the present invention further comprises: an elastic member adapted to push the valve element in the direction to open the valve element; and the load pushing the valve element in the direction to open the valve element is a total of: a product of the pressure of the hydraulic chamber being applied to the pressure receiving face of the valve opening side, and the area of the pressure receiving face of the valve element; and an elastic force of the elastic member.

In addition, the sheave positioning device of the present invention further comprises: a solenoid valve, which is controlled electrically to control feeding and discharging of the pressure fluid applying a pressure to the pressure receiving face of the valve closing side.

According to the present invention, the valve element is actuated to be closed by the thrust force of the valve closing mechanism, and as a result, the pressure fluid being supplied to the hydraulic chamber to fix the position of the movable sheave is prevented from being discharged from the hydraulic chamber. That is, the pressure fluid is held in the hydraulic chamber to keep the constant speed change ratio by fixing the position of the movable sheave. Therefore, leakage of the pressure fluid will not occur in case of thus keeping the speed change ratio constant so that energy loss can be prevented or reduced. For this reason, in case of applying the present invention to a vehicle, fuel consumption of the vehicle can be improved. In addition, in case the pressure in the hydraulic chamber is raised to the maximum pressure, the load to be applied to the valve element in the direction to open the valve element is greater than the thrust force applied to the valve element from the valve closing mechanism. Therefore, even in case the thrust force from the valve closing mechanism cannot be stopped due to a failure of the valve closing mechanism or the like, the valve element can be opened against the thrust force to discharge the pressure fluid from the hydraulic chamber. That is, even in case a failure occurs in the valve closing mechanism, a speed change of the belt-type continuously variable transmission can be carried out by unlocking the speed change ratio by opening the valve element during a process of raising the pressure in the hydraulic chamber to the maximum pressure.

In addition to the above-explained advantages, even in case the pressure fluid cannot be further fed to the hydraulic chamber holding the pressure fluid therein by the valve element, the sheave positioning device of the present invention is capable of applying a load to the movable sheave in the direction to move the movable sheave away from the fixed sheave. Therefore, the pressure in the hydraulic chamber pushing the movable sheave can be raised to the maximum pressure. For this reason, even in case the thrust force being applied to the valve element cannot be stopped due to a failure of the valve closing mechanism, a speed change can be carried out by opening the flow path thereby discharging the pressure from the hydraulic chamber.

Moreover, according to the present invention, the pressure in the hydraulic chamber can be raised to the maximum pressure by increasing a tension of the belt by raising a pressure in the second hydraulic chamber. That is, in case the thrust force being applied to the valve element cannot be stopped due to an occurrence of some kind of failure in the valve closing mechanism, a speed change can be carried out by raising the hydraulic pressure fed to the second hydraulic chamber thereby opening the flow path.

Further, according to the present invention, the valve element of the valve closing mechanism can be kept closed against the elastic force of the elastic member. However, in case the pressure in the hydraulic chamber is raised, a total force of load derived from the pressure of the hydraulic chamber and the elastic force of the elastic member exceeds the thrust force of the valve closing mechanism. As a result, the valve element is opened so that the speed change can be carried out.

Furthermore, according to the present invention, even in case the thrust force being applied to the valve element in the direction to close the valve element cannot be stopped due to an electrical failure of the solenoid valve such as a breaking or a short circuit, a speed change can be carried out by opening the valve element during a process of raising the pressure in the hydraulic chamber to the maximum pressure.

BEST MODE FOR CARRYING OUT THE INVENTION

Figure 1:
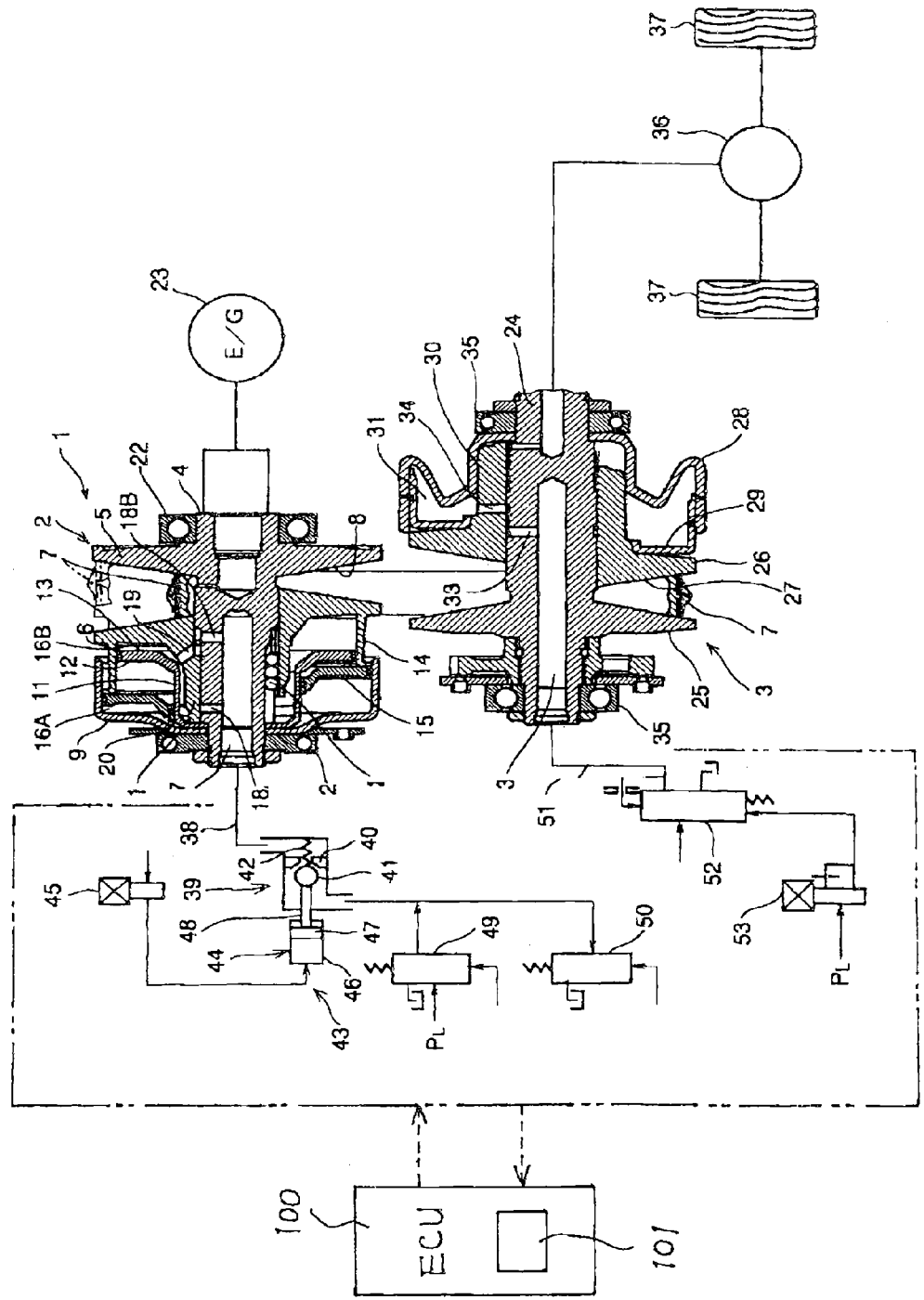
FIG. 1 is a hydraulic circuit diagram schematically showing the sheave positioning device of the present invention.

The present invention will be explained more specifically hereinafter. The present invention relates to a device for controlling a position of a movable sheave, specifically, for controlling a position of a movable sheave for setting a speed change ratio of a belt-type continuously variable transmission. Therefore, an example of a belt-type continuously variable transmission will be explained first of all. In FIG. 1, there is shown a belt-type continuously variable transmission (as will be called a "continuously variable transmission" or "CVT" hereinafter) 1 to be mounted on a vehicle. As shown in FIG. 1, a rotation axis of a primary pulley 2 of a driving side (or an input side) and a rotation axis of a secondary pulley 3 of a driven side (or an output side) are arranged parallel to each other. In FIG. 1, an upper half of each of the pulley 2 and 3 and a lower half of each of the pulley 2 and 3 illustrate different conditions. Specifically, an upper half of the primary pulley 2 and a lower half of the secondary pulley 3 indicate a condition for setting a speed change ratio of low speed side, and a lower half of the primary pulley 2 and an upper half of the secondary pulley 3 indicate a condition for setting a speed change ratio of high speed side.

The primary pulley 2 comprises a fixed sheave 5 adapted to be rotated integrally with an input shaft 4, and a movable sheave 6 arranged to be opposed to the fixed sheave 5 in a manner to reciprocate axially on the input shaft 4. Both of the faces of the sheaves 5 and 6 being opposed to each other are tapered, and a belt 7 is applied therebetween. That is, a clearance between the tapered faces of the sheaves 5 and 6 serves as a groove 8 to which the belt 7 is applied.

A mechanism for pushing the movable sheave 6 toward the fixed sheave 5 is arranged behind the movable sheave 6 (i.e., on an opposite side of the tapered face being opposed to the fixed sheave 5). In the example shown in FIG. 1, a double chamber type mechanism is used to serve as the aforementioned mechanism. Specifically, a cylinder member 9 is fitted onto the input shaft 4 on a back side of the movable sheave 6 in a manner to open to a back face of the movable sheave 6. A bulkhead 13 is also fitted onto the input shaft 4 to be situated in an inner circumferential side of the cylinder member 9. The bulkhead 13 comprises a cylindrical portion 11 whose diameter is slightly larger than that of a boss 10 of the movable sheave 6, and a flange 12 extending radially outwardly from an opening end of the cylindrical portion 11. The boss 10 of the movable sheave 6 is inserted into the cylindrical portion 11 of the bulkhead 13, and a cylindrical portion 14 protruding toward the cylinder member 9 is formed integrally on the back face of the movable sheave 6 along an outer circumference thereof.

A piston member 15 is housed in the cylinder member 9 in a manner to move axially back and forth. Specifically, an outer circumferential portion of the piston member 15 is contacted liquid-tightly with an inner circumferential face of the cylinder member 9 in a slidable manner, and an inner circumferential portion of the piston member 15 is contacted liquid-tightly with an outer circumferential face of the cylindrical portion 11 of the bulkhead 13 in a slidable manner. In addition, a leading end of the cylindrical portion 14 of the movable sheave 6 is contacted with the piston member 15, and an outer circumferential end of the flange 12 of the bulkhead 13 is contacted liquid-tightly with an inner circumferential face of the cylindrical portion 14 the movable sheave 6 in a slidable manner. Consequently, a hydraulic chamber 16A is formed between the cylinder member 9 and the piston member 15, and a hydraulic chamber 16B is formed between the bulkhead 13 and the back face of the movable sheave 6. Accordingly, operating oil corresponding to a pressure fluid of the present invention is fed to those hydraulic chambers 16A and 16B and discharged from those hydraulic chambers 16A and 16B. In addition, a space between the piston member 15 and the bulkhead 13 is communicated with an external space so that resisting force will not be generated even if a capacity thereof is varied.

Here will be explained oil passages for feeding and discharging the operating oil to/from the hydraulic chambers 16A and 16B. An oil passage 17 is formed in the input shaft 4 along a center axis thereof, and diametrically smaller oil passages 18A and 18B are branched radially from the oil passage 17 toward the hydraulic chambers 16A and 16B. Further, a through hole 19 is formed in the boss 10 of the movable sheave 6 to connect the branched oil passage 18B and the hydraulic chamber 16B, and a through hole 20 is formed in the bulkhead 13 to connect the hydraulic chambers 16A and 16B.

In FIG. 1, reference numeral 21 represents a ball spline. By this ball spline 21, the movable sheave 6 is integrated with the input shaft 4 in a rotational direction, and allowed to be reciprocated smoothly along the axis of the input shaft 4. Meanwhile, reference numeral 22 represents bearings. That is, the input shaft 4 is held by those bearings 22 in a rotatable manner, and power of a predetermined prime mover such as an engine (E/G) 23 is inputted to the input shaft 4.

Next, the secondary pulley 3 will be explained hereinafter. The secondary pulley 3 comprises a fixed sheave 25 adapted to be rotated integrally with the input shaft 24, and a movable sheave 26 arranged to be opposed to the fixed sheave 25 in a manner to reciprocate axially on an output shaft 24. Both of the faces of the sheaves 25 and 26 being opposed to each other are tapered, and a belt 7 is applied therebetween. That is, a clearance between the tapered faces of the sheaves 25 and 26 serves as a groove 27 to which the belt 7 is applied.

A mechanism for pushing the movable sheave 26 toward the fixed sheave 25 thereby generating a clamping force for clamping the belt 7 is arranged behind the movable sheave 26 (i.e., on an opposite side of the tapered face being opposed to the fixed sheave 25). Specifically, a cylinder member 28 is fitted onto the output shaft 24 on a back side of the movable sheave 26 in a manner to open to a back face of the movable sheave 26. Further, a cylindrical piston member 29 is attached integrally to the back face of the movable sheave 26 while being contacted liquid tightly with an inner circumferential face of the cylinder member 28 in a slidable manner. Consequently, a space is formed by the inner face of the cylinder member 28, the inner face of the piston member 29, and an outer circumferential face of a boss 30 of the movable sheave 26 inserted into a central portion of the cylinder member 28. The space thus created serves as a hydraulic chamber 31 corresponding to a second hydraulic chamber of the present invention.

Here will be explained oil passages for feeding and discharging the operating oil to/from the hydraulic chamber 31. An oil passage 32 is formed in the output shaft 24 along a center axis thereof, and diametrically smaller oil passage 33 is branched radially from the oil passage 32 toward the hydraulic chamber 31. Further, a through hole 34 is formed in the boss 30 of the movable sheave 26 to connect the branched oil passage 33 and the hydraulic chamber 31.

In FIG. 1, reference numeral 35 represents bearings. That is, the output shaft 24 is held by those bearings 35 in a rotatable manner, and a torque is transmitted from the output shaft 24 to drive wheels 37 through a transmission mechanism including a final reduction mechanism (i.e., a differential) 36.

The continuously variable transmission 1 shown in FIG. 1 is adapted to carry out a speed change operation by displacing the movable sheave 6 of the primary pulley 2, and a transmission torque capacity thereof is determined in accordance with a clamping force clamping the belt 7 by the fixed sheave 25 and the movable sheave 26 of the secondary pulley 3. Therefore, a configuration of a hydraulic circuit (or an oil pressure circuit) for controlling a speed change operation and a clamping force will be explained hereafter. A flow path 38 is communicated with the oil passage 17 formed in the input shaft 4, and the operating oil for the speed change control flows therethrough. In order to hold the operating oil in the hydraulic chambers 16A and 16B of the primary pulley 2, a check valve 39 is arranged on the flow path 38.

The check valve 39 comprises: a valve seat 40; a ball 41 as a valve element that closes the flow path 38 when pushed onto the valve seat 40; and a return spring 42 as an elastic member that pushes the ball 41 away from the valve seat 40. Specifically, in the check valve 39 thus arranged, the ball 41 is pushed onto the valve seat 40 by a force arising from the operating oil flowing toward the hydraulic chambers 16A and 16B, and to the contrary, the ball 41 is pushed away from the valve seat 40 by a force arising from the operating oil discharged from the hydraulic chambers 16A and 16B. Therefore, an elastic force of the return spring 42 is set to a level possible to isolate the ball 41 from the valve seat 40 even in case of feeding the operating oil to the hydraulic chambers 16A and 16B.

Figure 2:
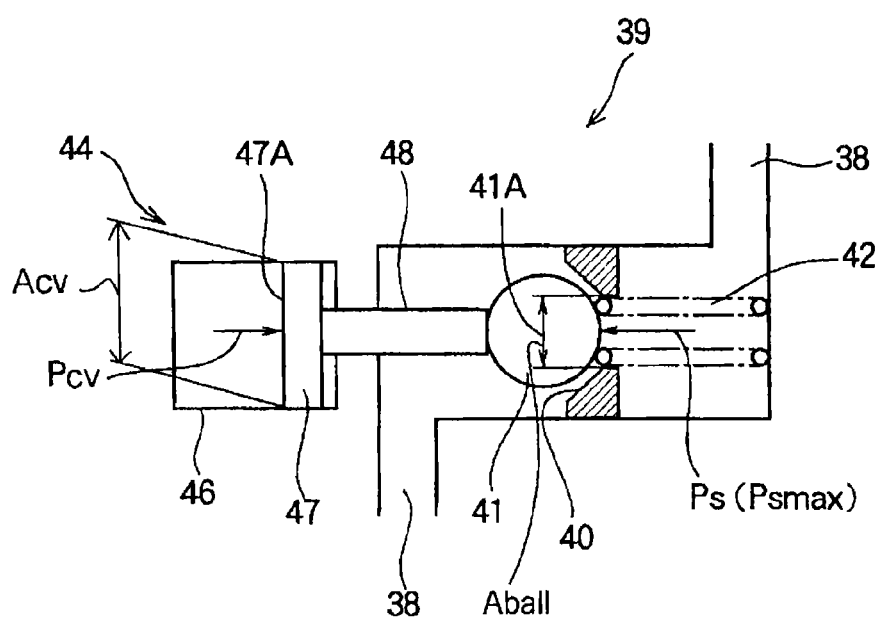
FIG. 2 is a schematic view showing the check valve and the valve closing mechanism in an enlarged scale.

In order to keep the check valve 39 closing, there is provided a valve closing mechanism 43. The valve closing mechanism comprises: an actuator 44 adapted to generate a thrust force for pushing the ball 41 onto the valve seat 40; and a solenoid valve 45 adapted to control feeding and discharging of the pressure fluid (i.e., the operating oil) to/from the actuator 44. The actuator 44 comprises a piston 47 housed in a cylinder 46, and a rod 48 integrated with the piston 47 and contacted with the ball 41. The actuator 44 thus structured is adapted to generate a thrust force (i.e., pushing force) according to hydraulic pressure supplied to the cylinder 46. Specifically, as shown in FIG. 2, the ball 41 is pushed toward the valve seat 40 by a thrust force as a product of: the hydraulic pressure fed to the cylinder 46 represented as Pcv; and an area of a pressure receiving face (of a valve closing side) 47A of the piston 47 represented as Acv (Pcv·Acv). The aforementioned solenoid valve 45 is an on-off valve, which is adapted to feed the hydraulic pressure to the actuator 44 when it is turned on or off, and to discharge the hydraulic pressure from the actuator 44 when it is tuned to the opposite condition.

Hereinafter, the thrust force to be generated by the actuator 44 will be explained in more detail. The check valve 39 is adapted to hold the operating oil in the hydraulic chambers 16A and 16B thereby setting a predetermined speed change ratio by the primary pulley 2. For this purpose, the actuator 44 is adapted to generate greater thrust force against the load pushing the ball 41 to the opening direction of the valve (i.e., to the left side in FIG. 1) under the situation where the primary pulley 2 is setting the predetermined speed change ratio. Specifically, the load pushing the ball 41 in the opening direction of the valve in case the predetermined speed change ratio is being set can be expressed by a formula: (Ps·Aball+Fsp), where Ps represents a pressure in the hydraulic chambers 16A and 16B; Aball represents the area of the ball 41 subjected to the pressure Ps of the hydraulic chambers 16A and 16B (i.e., a pressure receiving area of a pressure receiving face 41A of the valve opening side); and Fsp represents an elastic force of the return spring 42. The thrust force to be generated by the actuator 44 has to be greater than the load pushing the ball 41 in the opening direction of the valve. Therefore, the actuator 44 is adapted to generate a thrust force satisfying the following inequality:

$$Ps \cdot Aball + Fsp < Pcv \cdot Acv$$

In addition, the hydraulic pressure Pcv fed to the actuator 44 may be a predetermined pressure depending on a structural condition.

In addition, according to the present invention, the operating oil can be discharged from the hydraulic chambers 16a and 16B setting a speed change ratio, even in case the hydraulic pressure cannot be discharged from the actuator 44 due to a failure of the solenoid valve 45 or the like. Specifically, according to the present invention, the load pushing the ball 41 in the opening direction of the valve exceeds the thrust of the actuator 44 in case the pressure Ps in the hydraulic chambers 16A and 16B reaches a maximum pressure Psmax. The maximum pressure Psmax can be expressed as:

$$Psmax = 1/Ain \cdot \tau \cdot (Poutmax \cdot Aout + C)$$

where Ain represents a pressure receiving area of the movable sheave 6 of the primary pulley 2; and τ represents a thrust ratio, that is, a ratio between a thrust Wout of the secondary pulley 3 and a thrust Win of the primary pulley 2 (Wout/Win). Poutmax in the above formula represents a maximum pressure in the secondary pulley 3, and for example, a line pressure as an initial pressure of the continuously variable transmission 1 may be used as Poutmax in the above formula. In addition, in the above formula, Aout represents an area of a pressure receiving face of the secondary pulley 3, and C is a constant representing a known value, e.g., an elastic force of a not shown spring arranged in the secondary pulley 3, a centrifugal hydraulic pressure obtained from a rotational speed and a map, etc. The above-explained thrust ratio τ can be obtained from a drive demand such as an opening degree of an accelerator, a speed change ratio and so on; the maximum pressure Poutmax in the secondary pulley 3 can be detected using a sensor; and the other values are governed by a structural condition. Accordingly, the maximum pressure Psmax of the primary pulley 2 can be obtained using the above formula.

That is, the load pushing the ball 41 in the opening direction of the valve in case the pressure in the primary pulley 2 becomes maximum pressure Psmax thus obtained can be expressed by the following formula:

$$Psmax \cdot Aball + Fsp.$$

According to the present invention, the maximum load as indicated above is greater than the thrust (Pcv·Acv) of the valve closing mechanism 43 pushing the ball 41. Specifically, according to the present invention, the pressure receiving area Acv of the actuator 44 is designed to satisfy the following inequality:

$$Ps \cdot Aball + Fsp < Pcv \cdot Acv < Psmax \cdot Aball + Fsp.$$

The flow path 38 on which the check valve 39 is arranged is communicated with an upshift control valve 49 and a downshift control valve 50. Those control valves 49 and 50 are on-off valves opened and closed according to a signal pressure, and the upshift control valve 49 is adapted to connect the flow path 38 selectively with an oil passage 51 to which the line pressure PL (or a hydraulic pressure established by regulating the line pressure) is fed. Meanwhile, the downshift control valve 50 is adapted to connect the flow path 38 selectively with a drain portion. In addition, the signal pressure is fed to those control valves 49 and 50 and interrupted by a not shown solenoid valve.

On the other hand, a pressure regulating valve 52 is communicated with the oil passage 32 of the secondary pulley 3, and the pressure regulating valve 52 is adapted to regulate the line pressure PL (or a hydraulic pressure established by regulating the line pressure) according to an input torque to the continuously variable transmission 1. Specifically, a pressure regulating level of the pressure regulating valve 52 is varied in accordance with a pressure regulating signal pressure fed from a linear solenoid valve 53, and the pressure regulating valve 52 outputs a hydraulic pressure according to the pressure regulating level thereof to the secondary pulley 3.

Next, a position control of the movable sheave 6 of the primary pulley 2, that is, a speed change control will be explained hereinafter. As explained, a torque transmission capacity of the belt-type continuously variable transmission is governed by the clamping force for clamping the belt 7, therefore, the hydraulic pressure fed to the hydraulic chamber 31 of the secondary pulley 3 is controlled on the basis of a drive demand such as an opening degree of the accelerator. Specifically, the linear solenoid valve 53 is controlled to output regulating signal pressure in accordance with the drive demand. As a result of thus setting a clamping force for clamping the belt 7, the belt 7 is pushed outwardly in a groove 27 toward the outer circumferential side of the secondary pulley 3, and a tension of the belt 7 is thereby increased. In this situation, the belt 7 in the groove 8 of the primary pulley 2 is pulled toward the inner circumferential side of the groove 8. However, the position of the movable sheave 6 is controlled to set a demanded speed change ratio. Therefore, a running radius of the belt 7 will not be varied by the clamping force.

In case of reducing the speed change ratio in connection with an increase in a vehicle speed or the like, that is, in case of carrying out an upshifting, the operating oil is fed from the upshift control valve 49 to the hydraulic chambers 16A and 16B of the primary pulley 2. In this situation, the movable sheave 6 is pushed toward the fixed sheave 5 by the operating oil. Consequently, the belt 7 in the groove 8 is pushed gradually outwardly and the running radius of the belt 7 in the primary pulley 2 is thereby increased. Meanwhile, in the secondary pulley 3, the movable sheave 26 is further moved away from the fixed sheave 25 and the belt 7 is thereby allowed to get into the inner circumferential side of the groove 27. As a result, the running radius of the belt 7 in the secondary pulley 3 is decreased gradually.

To the contrary, in case of increasing the speed change ratio, that is, in case of carrying out a downshifting, the operating oil in the hydraulic chambers 16A and 16B of the primary pulley 2 is discharged from the downshift control valve 50 to the drain portion. Here, in the primary pulley 2, a force is being applied to the movable sheave 6 to move the movable sheave 6 away from the fixed pulley 5 thereby widening the groove 8. Therefore, when the pressure is discharged from the hydraulic chambers 16A and 16B, the movable sheave 6 is moved backwardly in proportion to a discharging amount of the operating oil, and the running radius of the belt 7 in the primary pulley 2 is decreased gradually. Meanwhile, in the secondary pulley 3, a hydraulic pressure is applied to the movable sheave 26 in a direction to move the movable sheave 26 toward the fixed sheave 25. Therefore, the running radius of the belt 7 in the secondary pulley 3 is increased in accordance with the reduction in the running radius of the belt 7 in the primary pulley 2. Specifically, the upshifting and downshifting as thus far explained are controlled by a feedback control for controlling a position of the movable sheave 6 of the primary pulley 2 or a feeding amount of the operating oil to the hydraulic chambers 16A and 16B, on the basis of a deviation between a target value and an actual value, e.g., on the basis of a target speed change ratio and a detected speed change ratio.

In case a drive demand such as an opening degree of an accelerator is constant so that a vehicle is cruising at a medium to high constant speed, the target speed change ratio will not be changed and the speed change ratio is kept to a constant ratio. In this case, the solenoid valve 45 of the valve closing mechanism 43 is actuated to allow the hydraulic pressure Pcv to be fed to the actuator 44. As a result, the piston 47 is moved toward the ball 41 side to push the ball 41 onto the valve seat 40. As described, the thrust of this case {Pcv·Acv} is greater than the total force {Ps·Aball+Fsp} of the pressure in the hydraulic chambers 16A and 16B and the elastic force of the return spring 42 acting in the direction to open the valve in this situation. Therefore, the ball 41 is pushed onto the valve seat 40 and the check valve 39 is thereby closed. As a result, the operating oil is held in the hydraulic chambers 16A and 16B for setting a speed change ratio by thus closing the flow path connected thereto. Therefore, a position of the movable sheave 6 will not be changed so that the speed change ratio is kept to a constant ratio. In this situation, it is unnecessary to feed the operating oil from the upshift control valve 49, therefore, a leakage of the operating oil resulting from a continuous feeding, or an energy loss resulting from discharging the operating oil can be prevented.

In case of carrying out a speed change operation, the pressure in the hydraulic chambers 16A and 16B is relieved by switching the solenoid valve 45 to discharge the operating oil from the actuator 44. As a result, the thrust force acting on the ball 41 in the direction of closing the valve is damped. Therefore, the ball 41 is moved in the direction to open the valve, by the elastic force of the return spring 42, or by the total thrust of the elastic force of the return spring 42 and the pressure in the hydraulic chambers 16A and 16B. Consequently, the flow path 38 is opened so that an upshifting is allowed to be carried out by feeding the operating oil to the hydraulic chambers 16A and 16B, and a downshifting is also allowed to be carried out by discharging the operating oil from the hydraulic chambers 16A and 16B.

Next, here will be explained a control for opening the valve compulsory, which is to be carried out in case the hydraulic pressure Pcv cannot be discharged from the actuator 44 due to a trouble of the solenoid valve 45 or an electric system thereof under the situation where the operating oil is being held in the hydraulic chambers 16A and 16B. A failure in which the check valve 39 cannot be opened can be detected by a failure detecting program 101 of an electronic control unit 100. Alternatively, such a failure in which the check valve 39 cannot be opened can be judged by detecting a fact in that the speed change ratio is not varied in spite of outputting a speed change command signal. In case such a failure of the check valve 39 is detected or judged, the pressure in the hydraulic chambers 16A and 16B of the primary pulley 2 is raised to the maximum pressure. For this purpose, since the operation oil cannot be fed to the hydraulic chambers 16A and 16B of the primary pulley 2 in this situation, a tension of the belt 7 is increased to the structurally determined maximum tension thereof. Specifically, the hydraulic pressure fed to the secondary pulley 3, that is, the hydraulic pressure for clamping the belt 7 is raised. When the hydraulic pressure being fed to the secondary pulley 3, the tension of the belt 7 is increased, and a load is thereby applied to the primary pulley 2 to move the movable sheave 6 away from the fixed sheave 5. As a result, the pressure in the hydraulic chambers 16A and 16B is raised.

As described, the thrust force pushing the ball 41 by the actuator 44 in the direction to close the valve is smaller than the load pushing the ball 41 in the direction to open the valve, in case the pressure in the hydraulic chambers 16A and 16B is raised to the maximum pressure. Therefore, the load pushing the ball 41 in the direction to open the check valve 39 exceeds the thrust force pushing the ball 41 in the direction to close the check valve 39 during a process to raise the pressure in the hydraulic chambers 16A and 16B to the structurally determined maximum pressure thereof. As a result, the check valve 39 is opened, that is, the speed change ratio is unlocked and a speed change is thereby allowed to be carried out. According to the example shown in FIG. 1, the primary pulley 2 is provided with the hydraulic chambers 16A and 16B for setting a speed change ratio. Therefore, in case of thus opening the check valve 39 compulsory, the operating oil is discharged from the hydraulic chambers 16A and 16B and the groove 8 of the primary pulley 2 is thereby widened. As a result, the running radius of the belt 7 is reduced to carry out a downshifting. Since the speed change ratio thus can be varied to the maximum ratio, sufficient driving force can be generated in case of accelerating the vehicle. In addition, even in case of restarting the vehicle, an engine stall can be prevented and the driving force can be ensured sufficiently.

The present invention should not be limited to the example thus far explained. For example, a valve element or a valve mechanism other than the check valve using a ball may be used to close the flow path. That is, a valve mechanism, which is configured to be opened and closed depending on a relation between the thrust in the direction to open the valve and the load to close the valve, may be used as a mechanism to close the flow path. In addition, the valve of this kind may be arranged on a flow path for discharging the pressure from the hydraulic chamber, instead of arranging the valve element on a flow path for feeding and discharging the operating oil to/from the hydraulic chamber. Further, the hydraulic chamber for setting a speed change ratio may also be arranged in the secondary pulley instead of the primary pulley.

The invention claimed is:

1. A sheave positioning device, comprising:
a pulley to which a belt is applied including a fixed sheave and a movable sheave being opposed to the fixed sheave, and a running radius of the belt of the pulley is changed in accordance with a clearance between the fixed sheave and the movable sheave;
a hydraulic chamber pushing the movable sheave toward the fixed sheave;
an oil passage connected to the hydraulic chamber;
a first control valve moving the movable sheave toward the fixed sheave by applying a pressure fluid selectively through the oil passage to the hydraulic chamber;
a second control valve moving the movable sheave away from the fixed sheave by discharging the pressure fluid selectively through the oil passage from the hydraulic chamber;
a flow path which allows discharge of the pressure fluid from the hydraulic chamber;
a check valve including a valve clement arranged on the flow path to close the flow path when pushed in a direction against a pressure from the hydraulic chamber between the hydraulic chamber, and the first control valve and the second control valve;
an actuator generating a thrust force to push the valve element in the direction to close the valve element by an applied hydraulic pressure from an operating fluid;
a solenoid valve applying the hydraulic pressure to the actuator; and
actuate the solenoid, valve so that the actuator generates the thrust force that is larger than a load to be applied to the valve element to push the valve element in a direction to open the valve element, in case a current speed change ratio is being kept,
switch the solenoid valve to discharge the operating fluid from the actuator so that the flow path is opened, in a case the current speed change ratio is being changed,
detect a failure of the check valve or a failure of the actuator by a failure detecting program of the control unit, and in a case of the failure of the check valve or the failure of the actuator the valve element is closed, and a speed command change signal is given, increase a tension of the belt in order to raise a pressure in the hydraulic chamber to a maximum pressure to move the movable sheave away from the fixed sheave so as apply an opening load to the valve element to open the flow path and to carry out a downshifting to a maximum ratio of the speed change ratio, wherein the thrust force generated by the actuator is less than the opening load due to the pressure in the hydraulic chamber being raised to the maximum pressure.

2. The sheave positioning device as claimed in claim 1, wherein:
the actuator comprises a piston member adapted to generate a thrust force as a product of a predetermined hydraulic pressure and au area of a pressure receiving face of a valve closing side of the piston to which the hydraulic pressure is applied;
the valve element comprises a pressure receiving face of a valve opening side having a predetermined area to generate a force for pushing the valve element in the direction to open the valve element when the pressure of the hydraulic chamber is applied thereto; and
the area of the pressure receiving face of the valve closing side is set to generate the thrust force when the hydraulic pressure is applied thereto, which is smaller than the load to be applied to the pressure receiving face of the valve opening side in the direction to open the valve element in case the pressure in the hydraulic chamber is raised to the maximum pressure.

3. The sheave positioning device as claimed in claim 1, further comprising:
a secondary pulley to which the belt is applied;
wherein the secondary pulley comprises
a second fixed sheave,
a second movable sheave being opposed to the second fixed sheave and adapted to move closer to the second fixed sheave and away from the second fixed sheave; and
a second hydraulic chamber adapted to push the second movable sheave toward the second fixed sheave,
wherein the electronic control unit is programmed to increase the tension in the belt to raise the pressure in the hydraulic chamber by raising a pressure in the second hydraulic chamber to a structurally governed maximum pressure thereof.

4. The sheave positioning device as claimed in claim 1, further comprising:
an elastic member adapted to push the valve element in the direction to open the valve element; and
wherein the load pushing the valve element in the direction to open the valve element is a total of:
a product of the pressure of the hydraulic chamber being applied to a pressure receiving face of the valve opening side, and the area of the pressure receiving face of the valve element; and
an elastic force of elastic member.

5. The sheave positioning device as claimed in claim 1, wherein the electronic control unit is programmed to detect the failure of the check valve by the failure detecting program, or when the speed change command signal is given and the speed change ratio is not varied.

* * * * *